United States Patent [19]

Takahashi

[11] 4,211,978

[45] Jul. 8, 1980

[54] CROSS-TALK COMPONENT CANCELLATION CIRCUIT IN AN ANGLE-MODULATED WAVE SIGNAL TRANSMISSION SYSTEM

[75] Inventor: Nobuaki Takahashi, Yamato, Japan

[73] Assignee: Victor Company of Japan, Limited, Yokohama, Japan

[21] Appl. No.: 899,891

[22] Filed: Apr. 25, 1978

[30] Foreign Application Priority Data

| Apr. 25, 1977 | [JP] | Japan | 52/47589 |
| Apr. 25, 1977 | [JP] | Japan | 52/47590 |
| Apr. 25, 1977 | [JP] | Japan | 52/47591 |
| Apr. 25, 1977 | [JP] | Japan | 52/47592 |
| Apr. 25, 1977 | [JP] | Japan | 52/47593 |
| Apr. 25, 1977 | [JP] | Japan | 52/47594 |

[51] Int. Cl.$^2$ .............................................. H04B 1/12
[52] U.S. Cl. ................................ 455/295; 179/1 GJ; 179/100.4 ST; 328/163; 455/304; 455/276
[58] Field of Search ...................... 325/472–476, 325/367, 371; 179/1 GQ, 1 GB, 1 GJ, 15 AN, 100.4 ST; 328/162, 163, 165

[56] References Cited

U.S. PATENT DOCUMENTS

| 3,864,516 | 2/1975 | Kameoka et al. | 179/100.4 ST |
| 4,002,840 | 1/1977 | Abe et al. | 179/100.4 ST |

*Primary Examiner*—Marc E. Bookbinder
*Attorney, Agent, or Firm*—Haseltine, Lake & Waters

[57] ABSTRACT

A cross-talk component cancellation circuit is used in an angle-modulated wave signal transmission system for transmitting first and second angle-modulated wave signals of at least two channels, wherein a cross-talk component of the second angle-modulated wave signal is admixed in the first angle-modulated wave signal. The cross-talk component cancellation circuit comprises a phase inverter for phase inverting the second angle-modulated wave signal, a first circuit for mixing the second angle-modulated wave signal and the phase-inverted second angle-modulated wave signal in respective mixing quantities with the first angle-modulated wave signal, a circuit for varying the mixing quantity in which at least one angle-modulated wave signal out of the second angle-modulated wave signal and the phase-inverted second angle-modulated wave signal is mixed by the first mixing means, a second circuit for mixing the signal thus mixed by the first mixing means in respective specific mixing quantities with the second angle-modulated wave signal and the phase-inverted second angle-modulated wave signal thereby to produce third and fourth angle-modulated wave signals, a circuit for operating to produce as output from the third and fourth angle-modulated wave signals a control signal for variably controlling the mixing quantity of the mixing quantity varying means and to supply said control signal to said varying means, and a circuit for obtaining the first angle-modulated wave signal the cross-talk component of which has been cancelled by the first mixing means.

10 Claims, 7 Drawing Figures

CROSS-TALK COMPONENT CANCELLATION CIRCUIT IN AN ANGLE-MODULATED WAVE SIGNAL TRANSMISSION SYSTEM

BACKGROUND OF THE INVENTION

The present invention relates generally to transmission systems for angle-modulated wave signals and to cross-talk component cancellation circuits therein. More particularly, the invention relates to a circuit for effectively canceling the cross-talk component of the angle-modulated wave signal of an adjacent channel admixed into the angle-modulated wave signal of one channel among the angle-modulated wave signals of a plurality of channels picked up from a multichannel record disc.

In a discrete 4-channel record disc, for example, the direct-wave sum signal and the angle-modulated wave difference signal of the signals of two channels out of the four channels are multiplexed and used as a right-channel signal. The direct-wave sum signal and the angle-modulated wave difference signal of the other two channels are multiplexed and used as a left-channel signal. The right-channel and left-channel signals thus obtained are recorded on the right and left walls of the same sound groove in the record disc.

In the recording system and the reproducing system for a multichannel record disc of this kind, cross-talk easily occurs between the angle-modulated wave signals of the right and left channel signals of the two walls of the sound groove. When this cross-talk occurs, the angles of the angle-modulated wave signals vary and give rise to intermodulation distortion thereby developing distortions in the demodulated signals.

One method known heretofore for reducing this cross-talk component comprises controlling the levels of the signals resulting from the demodulation of the angle-modulated wave signals responsively in accordance with the envelope of the angle-modulated wave signals. By this method, however, since reduction of the cross-talk component is carried out with respect to the demodulated signal, the cross-talk component cannot be completely removed.

SUMMARY OF THE INVENTION

Accordingly, it is a general object of the present invention to provide a novel and useful cross-talk component cancellation circuit in an angle-modulated wave signal transmission system in which circuit the above described problem is overcome.

Another and specific object of the invention is to provide a circuit capable of effectively canceling the cross-talk component with respect to the angle-modulated wave signals prior to demodulation thereof.

Another object of the invention is to provide a circuit capable of accurately canceling the cross-talk component with respect to the angle-modulated wave signals, in spite of errors of the produced voltages due to irregularities of circuits.

Other objects and further features of the invention will be apparent from the following detailed description with respect to preferred embodiments of the invention when read in conjunction with the accompanying drawings.

DETAILED DESCRIPTION

Figure 1:
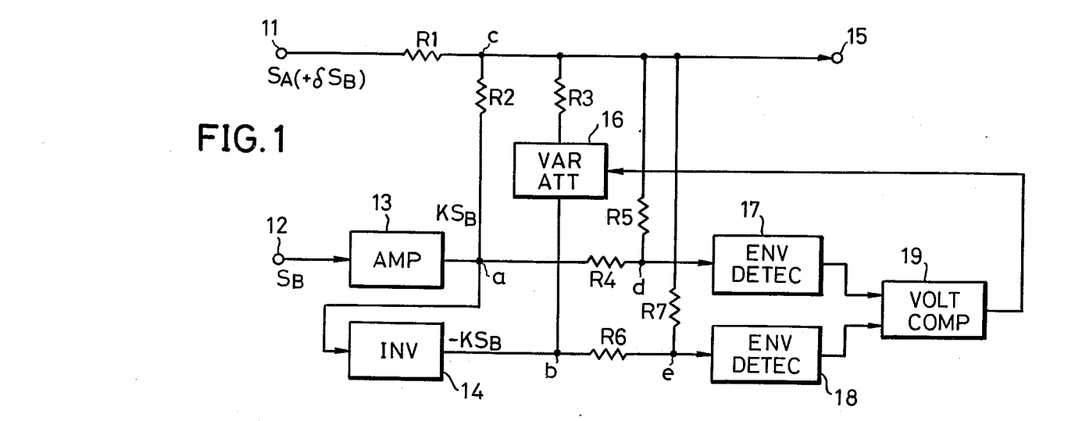
FIG. 1 is a block schematic diagram of a first embodiment of the cross-talk component cancellation circuit according to the invention in an angle-modulated wave signal transmission system.

Referring first to FIG. 1, the first embodiment of the cross-talk component cancellation circuit according to the invention will be described. In this embodiment of the invention, the circuit will be described as being adapted to cancel a cross-talk component from the left-channel angle-modulated wave signal which cross-talk component has become admixed into the right-channel angle-modulated wave signal of the angle-modulated wave signals of the right and left channels reproduced from a multichannel record disc. Since a circuit for cancellation of a cross-talk component with respect to the left-channel angle-modulated wave signal has a similar circuit organization, illustration and description thereof will be omitted.

The right-channel and left-channel angle-modulated wave signals $S_A$ and $S_B$ are respectively applied to input terminals 11 and 12. Here, the case where a cross-talk component $\delta S_B$ from the left-channel signal $S_B$ is admixed in the right-channel signal $S_A$ will be considered, and the operation of canceling this cross-talk component will be described.

The left-channel signal $S_B$ is amplified K times in an amplifier 13 and is thereafter inverted 180° in phase by a phase inverter 14. Accordingly, a signal $KS_B$ is obtained at a point a on the output side of the amplifier 13, and a signal $-KS_B$ is obtained at a point b on the output side of the phase inverter 14.

The input terminal 11 to which the right-channel signal $S_A$ is applied is connected by way of a resistor R1 to an output terminal 15. One terminal of each of resistors R2, R3, R5, and R7 is connected to the right-channel signal line from the resistor R1 to the output terminal 15. Here, if R1 << R2, R3, the impedance at a point c will be substantially equal to the resistance value of R1. The signal $KS_B$ at the point a is divided by a signal division ratio $\alpha$ determined by the resistance values of the resistors R1 and R2, and a signal $\alpha KS_B$ appears at the point c.

Between the resistor R3 and the point b is connected a variable attenuator 16 for attenuating signals with an attenuation quantity L. The signal $-KS_B$ at the point b is attenuated by the variable attenuator 16 and, furthermore, is divided by a signal division ratio $\beta$ determined by the resistance values of the resistors R1 and R3, whereby a signal $-\beta KLS_B$ appears at the point c.

The right-channel signal $S_A$ containing the cross-talk component $\delta S_B$ is being applied through the resistor R1 to this point c. As a result, the voltage Vc at this point c is given by the following equation.

$$V_C = S_A + \delta S_B + \alpha KS_B - \beta KLS_B \quad (1)$$
$$= S_A + (\delta + \alpha K - \beta KL)S_B$$

On one hand, the signal $KS_B$ at the point a is divided by the resistors R4 and R5 and appears at a division point d. Similarly, the signal $-KS_B$ at the point b is divided by resistors R6 and R7 and appears at a division point e. The voltage Vc at the point c is applied to the points d and e with division ratios of R4/(R4+R5) and R6/(R6+R7), respectively. Accordingly, the voltages Vd and Ve at the points d and e are respectively given by the following equations.

$$Vd = KS_B \cdot \frac{R5}{R4 + R5} + Vc \cdot \frac{R4}{R4 + R5} \quad (2)$$

$$Ve = -KS_B \cdot \frac{R7}{R6 + R7} + Vc \cdot \frac{R6}{R6 + R7} \quad (3)$$

Then, by writing $$R5/R4+R5=R7/R6+R7=\gamma \quad (4)$$

the following equation is obtained.

$$\frac{R4}{R4 + R5} = \frac{R6}{R6 + R7} = 1 - \gamma \quad (5)$$

When Eqs. (4) and (5) are substituted respectively into Eqs. (2) and (3), the following equations are obtained.

$$Vd = \gamma KS_B + (1-\gamma)Vc \quad (6)$$

$$Ve = -\gamma KS_B Z + (1-\gamma)Vc \quad (7)$$

When Eq. (1) is substituted into Eqs. (6) and (7) to cancel out the voltage Vc, the above mentioned voltages Vd and Ve are respectively expressed by the following equations.

$$Vd = (1-\gamma)S_A + \{(1-\gamma)(\gamma + \alpha K - \beta KL) + \gamma K\}S_B \quad (8)$$

$$Ve = (1-\gamma)S_A + \{(1-\gamma)(\delta + \alpha K - \beta KL) - \gamma K\}S_B \quad (9)$$

The voltages Vd and Ve at the points d and e, which are expressed by Eqs. (8) and (9), are supplied to envelope detection circuits 17 and 18 and thereby envelope detected. The resulting outputs of the envelope detection circuits 17 and 18 are supplied to a voltage comparator 19, where their level differences are compared. This voltage comparator 19 amplifies the voltage differences of the inputs and produces an output voltage, which is applied to the variable attenuator 16 as a control voltage for controlling the attenuation quantity L thereof.

Then, when there is cross-talk between the angle-modulated wave signals of the two channels, the envelope of the combined signal of the angle-modulated wave signals and the cross-talk component varies in response to the angle difference of the two angle-modulated wave signals. Accordingly, when signals of small cross-talk quantity are respectively compared, it is found that the quantity of variation of the envelope of the signals of large cross-talk quantity is also greater. The envelope detection circuit 17 and 18 have time constant circuits of longer falling time than wave rising time. For this reason, these envelope detection circuits 17 and 18 produce even greater DC outputs in the case where the cross-talk quantity is great.

The voltage comparator 19 compares the levels of the part of large envelope of the voltage Vd and the part of large envelope of the voltage Ve and accordingly produces as output a control voltage for carrying out control so that the attenuation quantity L of the variable attenuator 16 will become small when Vd>Ve. As a result, the operation of the circuit becomes stable at the time instant when the peak values of the envelopes of the voltages Vd and Ve become the same.

The conditions for the peak values of the envelopes of Eqs. (8) and (9) to become the same are as follows. The coefficients of the signal $S_A$ in Eqs. (8) and (9) are both $(1-\gamma)$ and, therefore, are the same. Then, the coefficient of the signal $S_B$ will be considered. In Eqs. (8) and (9), the condition for the coefficients of the signal $S_B$ to become the same is given by the following equation.

$$|(1-\gamma)(\delta+\alpha K-\beta KL)+\gamma K| = |(1+\gamma)(-\delta+\alpha K-\beta KL)-\gamma K| \quad (10)$$

When the signals in the absolute values of Eq. (10) are equal to each other, $\gamma K=0$ becomes the solution, but this is a solution which is unrelated to the present invention wherein the attenuation quantity L is variable. Accordingly, when Eq. (10) is solved for the case where the positive and negative signs in the absolute values of Eq. (10) are mutually opposite, the following equations are obtained.

$$\gamma = 1 \quad (11)$$

$$\beta KL = \delta + \alpha K \quad (12)$$

The solution of Eq. (11) has no relation to the present invention, in which the attenuation quantity is variable, but the solution of Eq. (12) does have a relation to the invention.

Accordingly, the variable attenuator 16 is so controlled that its attenuation quantity L will satisfy the following equation obtained from Eq. (12).

$$L = \delta + \alpha K/\beta K \quad (13)$$

The value of the voltage Vc becomes as follows when Eq. (13) is substituted into Eq. (1).

$$Vc = S_A \quad (14)$$

Accordingly, by controlling the attenuation quantity L of the variable attenuator 16 to the value indicated in Eq. (13), that is, by carrying out control so that the peak values of the envelopes of the voltages will become equal, the signal $S_A$ in which the cross-talk component $\delta S_B$ has been cancelled is obtained through the output terminal 15 as is apparent from Eq. (14). Therefore, by supplying the angle-modulated wave signal $S_A$ obtained through the output terminal 15 and not containing a cross-talk component to a demodulator (not shown) thereby to demodulate the same, good reproduced and demodulated signals without distortion are obtained.

While, in the above described embodiment of the invention, the variable attenuator is provided in series connection with the resistor R3, it may, instead, be provide in series connection with the resistor R2. Furthermore, two variable attenuation circuits may be connected in series respectively to the resistors R2 and R3.

Then, in the present invention, since the cancellation of the cross-talk component is accomplished through the analysis with the equations set forth hereinabove, it is necessary that the resistance ratios R4:R5 and R6:R7 of the resistors R4 through R7 be accurate. Another requirement is that the characteristics of both of the envelope detection circuits 17 and 18 be coincident. In general, however, there are some errors in these resistances, characteristics, and the like in many cases. Then, if there is such an error, the circuit operates in response to this error component as though it were a cross-talk component, whereby the effective result, undesirable, is that of applying a cross-talk error.

Figure 2:
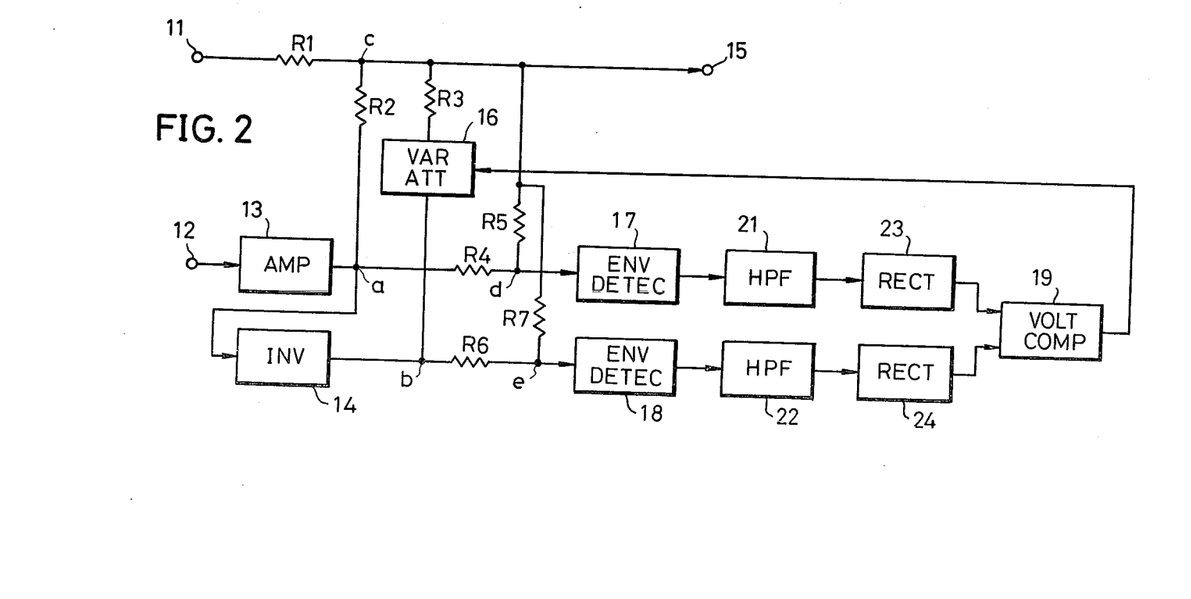
FIG. 2 is a block schematic diagram of a second embodiment of the cross-talk component cancellation circuit according to the invention.

This problem has been solved in a second embodiment of the invention as described hereinbelow in conjunction with FIG. 2. In FIG. 2, those parts which are the same as corresponding parts in FIG. 1 are designated by like reference numerals or characters. Description of such parts will be omitted.

The outputs of the envelope detection circuits 17 and 18 are respectively supplied to high-pass filters (DC component blocking circuits) 21 and 22, where the passage of their DC components is blocked, and only the AC components which undergo amplitude variation in response to the cross-talk quantity are passed. Consequently, the error components of the output DC voltages of the envelope detection circuits due to the above mentioned errors in resistance ratios, characteristics, and the like are removed. The resulting outputs of the high-pass filters 21 and 22 are respectively supplied to rectification circuits 23 and 24, where they are rendered into DC voltages responsive to the levels thereof, thereafter being supplied to the voltage comparator 19. The resulting output of the voltage comparator 19 controls the attenuation quantity L of the variable attenuator 16 similarly as in the preceding embodiment of the invention.

In accordance with the present embodiment of the invention, the attenuation quantity of the variable attenuation is controlled in response to only the AC components (amplitude variation components) of the envelopes of the voltages Vd and Ve. For this reason, even if there are errors in the above mentioned resistance ratios, characteristics, or the like, these errors have no effect, and good cancellation of the cross-talk component can be accomplished.

Figure 3:
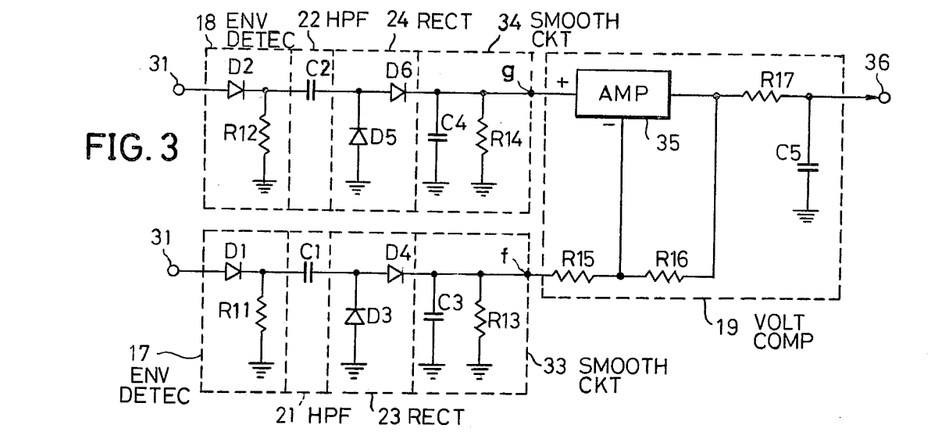
FIG. 3 is a circuit diagram of one embodiment of a specific circuit in concrete form of an essential part of the circuit shown in FIG. 2.

One example of a specific circuit in concrete form of an essential part of the circuit illustrated in block diagram form in FIG. 2 is shown in FIG. 3. In this circuit, the signals obtained at the points d and e in the circuit of FIG. 2 are applied through terminals 31 and 32 and supplied to the envelope detection circuits 17 and 18 respectively comprising a diode D1 and a resistor R11 and a diode D2 and a resistor R12, where they are envelope detected. The resulting signals of the envelope detection circuits 17 and 18 are passed through the DC blocking circuits 21 and 22 comprising capacitors C1 and C2, where their DC components are removed, and are thereafter sent to voltage-doubler, half-wave rectification circuits 23 and 24 respectively comprising diodes D3 and D4 and diodes D5 and D6, where the signals are subjected to halfwave rectification and converted into positive DC voltages.

The output voltage of the rectification circuit 24 is smoothed by a smoothing circuit 34 comprising a capacitor C4 and a resistor R4 and is then applied to the noninverting input terminal of an operational amplifier 35 of the voltage comparator 19. The output voltage of the rectification circuit 23 is smoothed by a smoothing circuit 33 comprising a capacitor C3 and a resistor R13 and is then applied by way of a resistor R15 to the inverting input terminal of the operational amplifier 35. The output side of the operational amplifier 35 is connected by way of a resistor R16 to its inverting input terminal and, at the same time, by way of a low-pass filter comprising a resistor R17 and a capacitor C5 to an output terminal 36.

The resistors R13 and R14 determine the time constant of the circuit for discharging the charges of the capacitors C3 and C4 and have high resistance values such as 1.2 MΩ, for example. The resistors R15 and R16 determine the amplification factor of the operational amplifier 35 and are selected at values such that R15<<R16. For example, the resistance values of the resistors R15 and R16 are respectively 39 KΩ and 2.2 MΩ. The reason for thus selecting these resistance values is to amplify each of the output DC voltages of the smoothing circuits 33 and 34 to as high a value as possible.

When the levels of the angle-modulated wave signals at the input terminals 31 and 32 are sufficiently high, the charges of the capacitors C3 and C5 have been accumulated, and the impedances of the input terminals 31 and 32 are low. As a consequence, the amplification factor R16/R15 of the operational amplifier operating as a differential amplifier becomes much greater than one (unity), (being 56 in the above recited example of resistance values), and the difference between the output DC voltages of the smoothing circuits 33 and 34 is amplified with a large gain.

In the case where the input angle-modulated wave signals applied to the input terminals 31 and 32 are nonexistent or are very small, output voltages are not produced at the output points f and g of the smoothing circuits 33 and 34 in a state such as, for example, the state prior to starting of playing of the multichannel record disc. Consequently, the impedances of the points f and g are at high values determined by the resistances of the resistors R13 and R14 since the diodes D4 and D6 are 'OFF'. The amplification factor of the amplifier 35 at this time becomes R16/(R13+R15) and numerically becomes 1.8, approximately, in the case of the above recited example of resistance values. Thus, the amplification factor drops greatly from R16/R15 to R16/(R13+R15), or, in the case of the above example of resistance values, from 56 to 1.8.

In the case of a circuit arrangement by which the impedances of the points f and g are not caused to vary in response to the input levels of the angle-modulated wave signals, the following problem arises. For example, in the case where the terminals on the ground (earth) side of the resistors R13 and R14 are not grounded but are connected to a negative bias voltage terminal, and the diodes D3 through D6 are so adapted that they are always conductive irrespective of the input levels of the angle-modulated wave signals, an offset voltage of a number of mV existing between the input terminals of the operational amplifier 35 becomes a voltage difference greater than a number of tens of mV because of deviations of the normal-direction voltages of the diodes D3 through D6. When the operational amplifier 35 amplifies with amply high gain an offset voltage of this character, a high output voltage becomes accumulated by way of the resistor R17 in the capacitor C5. For this reason, at the start of playing of the multichannel record disc, for example, the resultant effect is that of cross-talk becoming undesirably added, even though there is no cross-talk component in the picked up angle-modulated signals, until the charge in the capacitor C5 is discharged through the resistor R17.

In the circuit of the present embodiment of the invention, however, when the levels of the input angle-modulated wave signals are zero or very low, the diodes D3 through D6 all become 'OFF'. For this reason, there is no adverse effect of an offset voltage due to deviations of the normal-direction voltages of the diodes as mentioned above. In this case, furthermore, since the amplification factor of the the operational amplifier 35 becomes low, almost no control voltage is produced in the capacitor C5. Therefore, according to the circuit of the present embodiment of the invention, when the levels of the input angle-modulated wave signals are zero or very low, no output is produced from the voltage comparator 19, and the above described problem of the addition of cross-talk to the angle-modulated wave signals, particularly at the time of starting of playing of the multichannel record disc, does not arise.

In this case, when the circuit is in a state wherein there is no output from the voltage comparator 19, and the attenuation circuit 16 is not being controlled, it is necessary that the sum of the resistance values of the resistor R3 and of the variable attenuator 16 be so set as to be equal to the resistance value of the resistor R2.

However, it is assumed that the circuit is so organized that a field-effect transistor (FET), for example, is used for the variable attenuator 16, its drain and source being respectively connected to the resistor R3 and point b, and the output of the voltage comparator 19 is supplied to the gate of the FET thereby to vary the resistance Rds between the drain and source of the FET. In general, the voltage Vgs between the gate and the source corresponding to the resistor Rds between the drain and the source, which is equal to the resistance (R2−R3), strictly speaking, differs with the each FET and, furthermore, exhibits a value which differs also with variations of the ambient temperature. For this reason, in the circuit of the above described organization, when the output of the voltage comparator 19 is zero, it is very difficult to maintain the relationship Rds+R3=R2.

This is the same when a bipolar transistor is used in place of the FET, and, furthermore, the DC current amplification coefficient Hfe is unstable.

Figure 4:
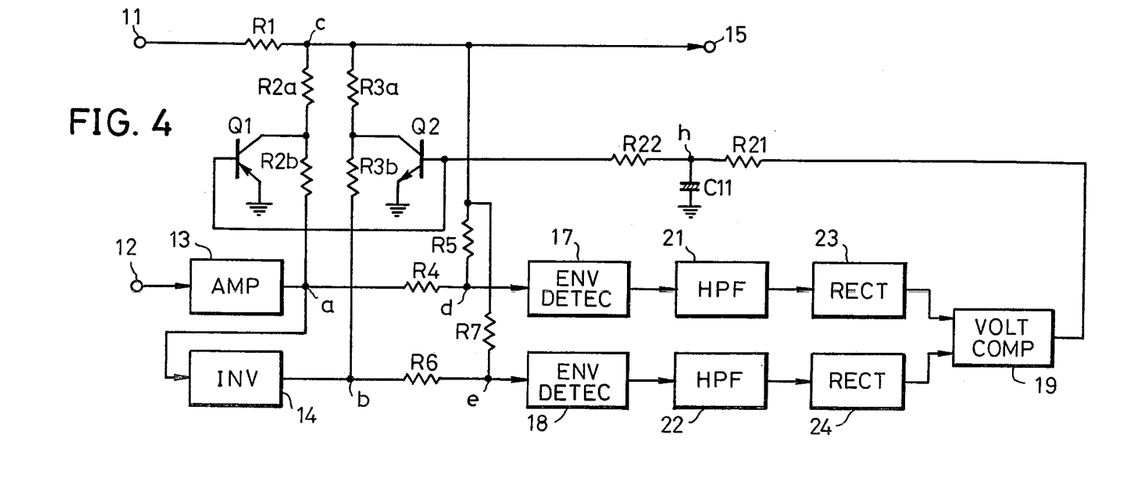
FIG. 4 is a block schematic diagram of a third embodiment of the cross-talk component cancellation circuit according to the invention.

This problem has been solved by still another embodiment of the invention as described below with reference to FIG. 4. In FIG. 4, those parts which are the same as corresponding parts in FIG. 2 are designated by like reference numerals or characters. Description of such parts will be omitted.

Between the points c and a, resistors R2a and R2b are connected instead of the resistor R2, and between the points c and b, resistors R3a and R3b are connected in place of the resistor R3. To the junction point between the resistors R2a and R2b and to the junction point between the resistors R3a and R3b, respectively, the collectors of a PNP transistor Q1 and an NPN transistor Q2, whose emitters are grounded (earthed), are connected. The output of the voltage comparator 19 is supplied through a resistor R21 to charge a capacitor C11, and this charged voltage is applied by way of a resistor R22 commonly to the bases of the transistors Q1 and Q2.

Then when the potential of the junction point h between the resistors R21 and R22 and the capacitor C11 is positive, the transistor Q1 is in its 'OFF' state, and the series-connected resistance value (R2a+R2b) becomes equal to the resistance value R2. As a consequence, the signal at the output point a of the amplifier 13 is mixed through this series-connected resistance value R2a+R2b with the signal at the point c. On the other hand, the transistor Q2 is in its 'ON' state, and, since a base current flows through the resistor R22 to the transistor Q2, a certain resistance R3c exits between its collector and emitter. Consequently, the signal at the output point b of the phase inverter 14 is divided by the resistors R3b and R3c, and, furthermore, the signal at the point c becomes mixed therewith through the resistor R3a. It is seen, when the signal voltage mixed at the point c is considered, that this means that the resistance value of the resistor R3 has equivalently become of a higher value than this resistance value.

In the case where the potential at the point h is negative, the transistor Q1 becomes 'ON', and the transistor Q2 becomes 'OFF' in a similar manner. Consequently, the signal at the point a is mixed with the signal at the point c through a resistance which has become equivalently higher than the resistance R2, and the signal at the point b is mixed with the signal at the point c through, equivalently, the resistance R3 (which is equal to R3a+R3b).

On the other hand, when the potential at the point h is zero or is very low, the transistors Q1 and Q2 both become 'OFF', and, for this reason, the values of the resistances between the collectors and emitters of the transistors Q1 and Q2 become very high. Accordingly, the output terminals of the amplifier 13 and the phase inverter 14 can be considered to be connected to the point c by way of the resistance R2 (=R2a+R2b) and the resistance R3 (=R3a+R3b). Therefore, by setting the resistance values of the resistors R2 and R3 beforehand at the same value, the output signal of the amplifier 13 and the phase-inverted output signal of the phase inverter 14 can be mixed in equal quantity at the point c and thus be canceled when the level of the input signal from the terminal 12 is zero or is very low. As a result, at this time, the left-channel signal from the terminal 12 becomes equivalently a signal which is not mixed with the right-channel signal from the terminal 11. In the circuit of the present embodiment of the invention, the problem of the instability of the voltage Vgs between the gate and the source of the FET as described hereinabove does not arise.

The time difference between, for example, the instant when the cross-talk component of the left-channel signal becomes mixed into the right-channel signal and the instant at which the cross-talk component cancellation circuit operates is not necessarily always constant because of reasons such as difference in the transmission paths. When this time difference has the relationship of $(2n-1) \lambda/4$ (where $n=1, 2 \ldots$) with respect to the wavelength $\lambda$ of the carriers of the angle-modulated wave signals, a phase difference of 90° is produced between the two signals at the instant when the cross-talk is about to be canceled with respect to the instant at which the cross-talk is to be added. In this case, therefore, the cross-talk component cannot be completely canceled by only the output signal of the amplifier 13 of phase difference 0° and the output signal of the phase inverter 14 of phase difference 180°.

Figure 5:
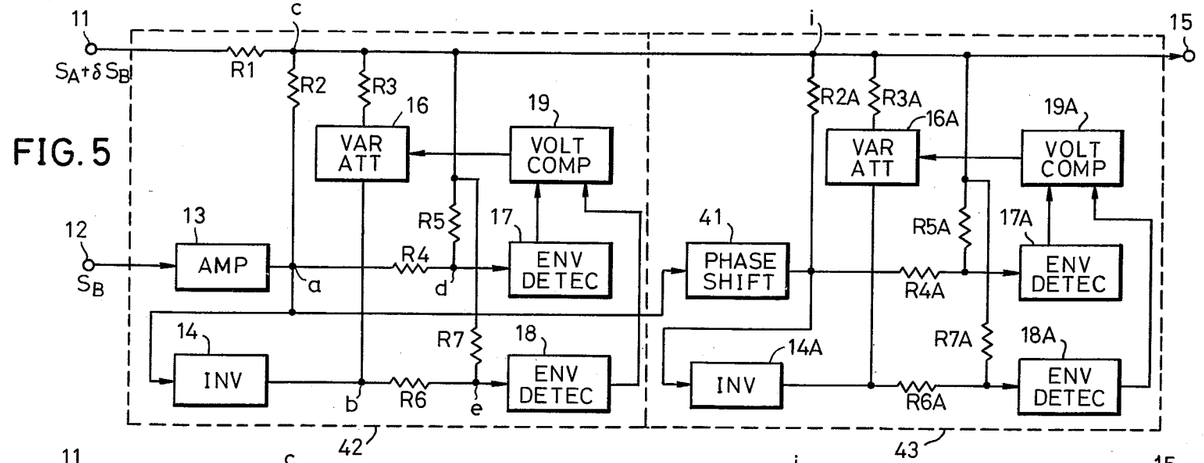
FIG. 5 is a block schematic diagram of a fourth embodiment of the cross-talk component cancellation circuit according to the invention.

An embodiment of the invention of a circuit organization by which the cross-talk component can be canceled irrespective of the phase difference at the above mentioned two points will now be described with reference to FIG. 5. In FIG. 5, those parts which are the same as corresponding parts in FIG. 1 are designated by like reference numerals or characters. Detailed description of such parts will not be repeated. Furthermore, corresponding similar circuit components are designated by like reference numerals or characters to which the subscript A has been appended.

The output signal of the amplifier 13 is supplied respectively to the envelope detection circuit 17 and through the phase inverter 14 to the envelope detection circuit 17, similarly as in the preceding embodiment of the invention, and at the same time, is supplied to a 90-degree phase shifter 41, where it is phase shifted by 90°. The resulting output of the phase shifter 41 is supplied to a phase inverter 14A, whereby a signal which has been phase shifted by 270° is obtained from the phase inverter 14A.

The output signal of the phase shifter 41 is also voltage divided by resistors R4A and R5A and mixed with a signal at the junction point i between the resistors R2A and R3A, and the resulting mixed signal is supplied to the envelope detector 17A. The above mentioned output signal of the phase inverter 14A is voltage divided by resistors R6A and R7A and, further, mixed with the signal at the junction point i after being divided by the resistors R6A and R7A. The resulting mixed signal is fed to the envelope detector 18A.

The outputs of the envelope detectors 17A and 18A are supplied to the voltage comparator 19A, the resulting output of which is used to control the attenuation quantity of the variable attenuator 16A. This operation is the same as that in the corresponding circuit without the subscript A.

As a result of this operation, the real component (0-degree or 180-degree component) of the cross-talk of the signal applied through the input terminal 11 is canceled by the circuit 42 constituting the left half of FIG. 5 and having reference symbols without the subscript A, while the imaginary component (90-degree or 270-degree component) of the crosstalk of the same signal is canceled by the circuit 43 constituting the right half of FIG. 5 and having reference symbols with the subscript A. The resulting signal is led out through the output terminal 15.

Futhermore, the case wherein there are no phase differences of 0° and 180° or 90° and 270°, but there are other phase differences with respect to the cross-talk component of the left-channel signal $S_B$ admixed in the right-channel signal $S_A$, for example, the case wherein there is a phase difference of 30°, will be considered. A cross-talk component of a phase difference of 30° can be vectorially divided into a cos 30° component in the 0-degree direction and a sin 30° component in the 90-degree direction. Then, cancellation of the cross-talk quantities of the cos 30° component and of the sin 30° component is carried out in response respectively to these components by the circuits 42 and 43, respectively.

Irrespective of the phase difference between the phases of mutually adjacent channels at the time instant when the cross-talk component is admixed and the phases of the mutually adjacent channels at the instant when the cross-talk cancellation circuit operates, this phase difference can be divided into vector components of 0°, 90°, 180°, and 270°. Accordingly, in the circuit of the instant embodiment of the invention, the cross-talk component divided into these vectors can be effectively canceled.

In this connection, the phase-shift angle of the phase shifter 41 need not be exactly 90°, it being possible to obtain substantially the same effective results when this phase-shift angle is within the range of approximately 90°±45°.

Furthermore, there is no problem in any of the above described embodiments of the invention in the case where the left-channel and right-channel signals are angle-modulated wave signals which have been obtained by angle modulating carrier waves of specific frequencies with separate modulating signals. However, in the case where the angle-modulated signals of the two channels have exactly equal angular deviations, the relationships of the magnitudes of the envelopes of the signals of the two channels does not correspond to the conditions for cancellation of the cross-talk components thereof. For this reason, erroneous operation is caused by deviations in the elements or components in the circuit in some cases.

Figure 6:
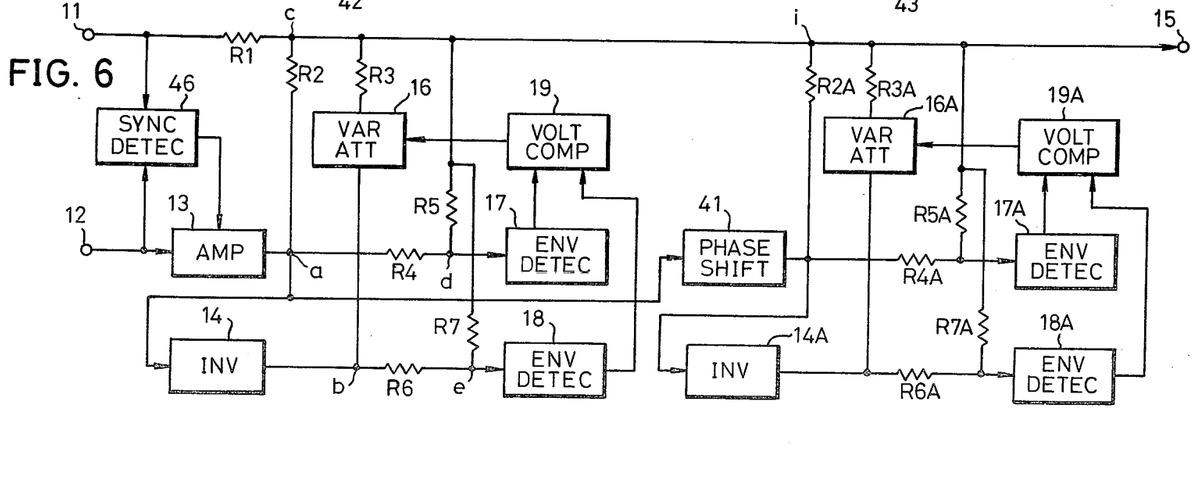
FIG. 6 is a block schematic diagram of a fifth embodiment of the cross-talk component cancellation circuit according to the invention.

A further embodiment of the invention wherein this problem is solved will now be described in conjunction with FIG. 6. In FIG. 6 those parts which are the same as corresponding parts in FIGS. 1 and 5 are designated by like reference numerals or characters. Such parts will not be described in detail again. The circuit of the present embodiment of the invention differs from the preceding circuits embodying the invention in that it is provided further with a synchronous detection circuit 46.

Input angle-modulated wave signals introduced into this circuit through the input terminals 11 and 12 are supplied to the synchronous detector 46, where this synchronism is detected. In the case where the angular deviations of the two input angle-modulated wave signals are equal, the synchronous detector 46 produces as output a control signal with respect to the amplifier 13 for reducing the gain thereof. As a consequence, the output of the amplifier 13 becomes very small, and, accordingly, the outputs of the phase inverter 14, the phase shifter 41, the phase inverter 14A, and the voltage comparators 19 and 19A also become very small, whereby the signals mixed at the points c and i also become very small.

Therefore, in the case where the angular deviations of the angle-modulated wave signals of the two channels are equal as described above, the cross-talk cancellation circuit becomes virtually inoperative, and adverse effects due to deviations in the circuit elements do not arise. In this case, moreover, since the angular deviation of the cross-talk component of the left-channel signal admixed in the right-channel signal is the same as the angular deviation of the right-channel signal, the distortion characteristic does not deteriorate, and no deleterious effect is produced even when the cross-talk component cancellation circuit is rendered inoperative.

In this connection, a circuit organization by which the voltage comparators 19 and 19A are so controlled that they do not produce outputs by the output of the synchronous detector 46 may also be used.

Figure 7:
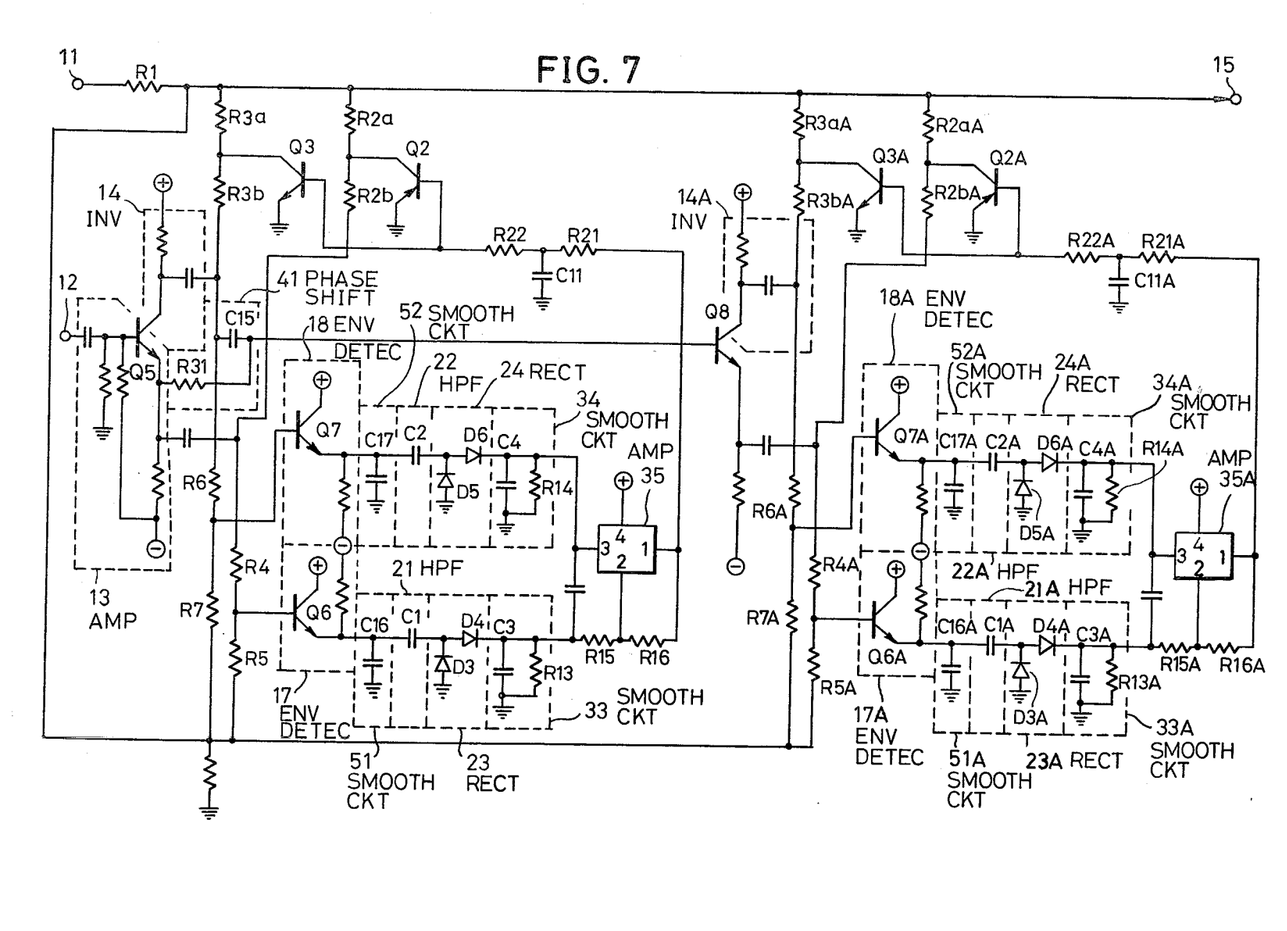
FIG. 7 is a circuit diagram of an electrical circuit in concrete form of the cross-talk component cancellation circuit according to the invention.

A specific example in concrete form of an electrical circuit embodying the invention will not be described with reference to FIG. 7. In FIG. 7 those parts which are the same as corresponding parts in FIGS. 1 through 5 are designated by like reference numerals or characters, and such parts will not be described in detail again.

A transistor Q5 is used commonly by the amplifier 13 and the phase inverter 14. A signal amplified and obtained from the emitter of this transistor Q5 is divided by the resistors R4 and R5 and fed to a transistor Q6 of the envelope detection circuit 17 and, at the same time, is supplied by way of the phase shifter 41 comprising a resistor R31 and a capacitor C15 to a transistor Q8. On the other hand, a signal which has been phase inverted and obtained from the collector of the transistor Q5 is divided by the resistors R6 and R7 and fed to a transistor Q7 of the envelope detection circuit 18. The resulting outputs of the envelope detection circuits 17 and 18 are smoothed by smoothing circuits 51 and 52 comprising capacitors C16 and C17 and are then fed to the highpass filters 21 and 22.

The signal obtained from the emitter of the transistor Q8 is divided by the resistors R4A and R5A and supplied to a transistor Q6A of the envelope detection circut 17A. A signal phase inverted and obtained from the collector of the transistor Q8 is divided by the resistors R6A and R7A and supplied to a transistor Q7A of the envelope detection circuit 18A. Other features of circuit organization and operation are the same or similar to those of the preceding embodiments of the invention and, therefore, can be readily understood from the preceding description. Accordingly, description of such features will not be repeated.

Further, this invention is not limited to these embodiments but various variations and modifications may be made without departing from the scope of the invention.

What is claimed is:

1. A cross-talk component cancellation circuit in an angle-modulated wave signal system for receiving first and second angle-modulated wave signals on at least two channels, wherein a cross-talk component of the second angle-modulated wave signal is admixed with the first angle-modulated wave signal, said cross-talk component cancellation circuit comprising:
   means for phase inverting the second angle-modulated wave signal;
   first means for mixing respective portions of the second angle-modulated wave signal and the phase-inverted second angle-modulated wave signal with the first angle-modulated wave signal to produce a first means output signal;
   means responsive to a control signal for varying at least one respective portion of the second angle-modulated wave signal and the phase-inverted second angle-modulated wave signal for mixing by the first means;
   second means for mixing the first means output signal with the second angle-modulated wave signal and the phase-inverted second angle-modulated wave signal in respective specific mixing quantities thereby to produce third and fourth angle-modulated wave signals;
   means responsive to the third and fourth angle-modulated wave signals to produce said control signal for variably controlling the amount of said at least one respective portion and to supply said control signal to said varying means; and
   means coupled to said first means for obtaining the first angle-modulated wave signal the cross-talk component of which has been canceled by the first means.

2. A cross-talk component cancellation circuit as claimed in claim 1 in which said varying means is so variably controlled that, in resultant effect, the peak values of the envelopes of the third and fourth angle-modulated wave signals become equal.

3. A cross-talk component cancellation circuit as claimed in claim 1 in which said means for producing said control signal comprises means for respectively envelope detecting the third and fourth angle-modulated wave signals and means for comparing the voltages of the resulting outputs of said envelope detecting means and producing as output said control signal.

4. A cross-talk component cancellation circuit as claimed in claim 1 in which said varying means comprises variable attenuation means having a resistance value which is varied.

5. A cross-talk component cancellation circuit as claimed in claim 3 in which said means for producing as output said control signal further has means for blocking a DC component of the output of the envelope detecting means and means for rectifying the output of said DC component blocking means and supplying the resulting output thus rectified to said voltage comparing means, and said varying means variably controls said at least one respective portion in a manner such that the variations of the envelopes of the third and fourth angle-modulated wave signals will become equal to each other.

6. A cross-talk component cancellation circuit as claimed in claim 1 in which said means for producing said control signal is so organized to produce no control signal at an instant when the level of said first angle-modulated wave signal is zero or extremely small.

7. A cross-talk component cancellation circuit as claimed in claim 5 in which rectifying means comprises a rectifier which is applied with a bias voltage when the level of said input angle-modulated wave signal is zero or extremely small.

8. A cross-talk component cancellation circuit as claimed in claim 1 in which said first means comprise first resistance means for mixing the second angle-modulated wave signal with the first angle-modulated wave signal and second resistance means for mixing the phase-inverted second angle-modulated wave signal with the first angle-modulated wave signal; said varying means comprises first and second variable resistance means which are respectively connected in series with the first and second resistance means and for varying respective resistance values by being applied with control signals from the control signal producing means; and said first and second variable resistance means are so organized to assume their OFF states at an instant when the level of the control signal becomes zero or an extremely small value whereby a mixing operation of the mixing means does not take place.

9. A cross-talk component cancellation circuit as claimed in claim 1 which further comprises synchronous detection means which is supplied with said first and second angle-modulated wave signals, detects a coincidence of the angle deviations of said signals, and produces a signal for stopping substantially the mixing operation of the first means when the angle deviations are coincident.

10. A cross-talk component cancellation circuit in an angle-modulated wave signal system for receiving first and second angle-modulated wave signals on at least two channels, wherein a cross-talk component of the second angle-modulated wave signal is admixed with the first angle-modulated wave signal, said cross-talk component cancellation circuit comprising:

first phase inverting means for phase inverting the second angle-modulated wave signal;

first means for mixing first respective portions of the second angle-modulated wave signal and the phase-inverted second angle-modulated wave signal with the first angle-modulated wave signal to produce a first means output signal;

first variable means responsive to a first control signal for varying at least one of said first respective portions of the second angle-modulated wave signal and the phase-inverted second angle-modulated wave signal for mixing by the first means;

second means for mixing the first means output signal with the second angle-modulated wave signal and the phase-inverted second angle-modulated wave signal in respective specific mixing quantities thereby to produce third and fourth angle-modulated wave signals;

first control signal producing means to produce said first control signal in response to the third and fourth angle-modulated wave signals for variably controlling the amount of said at least one of said first respective portions and to supply said first control signal to said first variable means;

means for phase shifting the second angle-modulated wave signal;

second phase inverting means for phase inverting the phase shifted second angle-modulated wave signal;

third means for mixing second respective portions of the phase shifted second angle-modulated wave signal and the phase shifted and phase-inverted second angle-modulated wave signal with the first means output signal to produce a third means output signal;

second variable means responsive to a second control signal for varying at least one of said second respective portions of the phase shifted second angle-modulated wave signal and the phase shifted and phase-inverted second angle-modulated wave signal for mixing by the third means;

fourth means for mixing the third means output signal with the phase shifted second angle-modulated wave signal and the phase shifted and phase-inverted second angle-modulated wave signal in respective specific mixing quantities thereby to produce fifth and sixth angle-modulated wave signals;

second control signal producing means to produce said second control signal in response to the fifth and sixth angle-modulated wave signals for variably controlling the amount of said at least one of said second respective portions and to supply said second control signal to said second variable means; and means coupled to said third mixing means for obtaining the first angle-modulated wave signal the cross-talk component of which has been canceled by the first, second, third and fourth mixing means.

* * * * *